United States Patent [19]

Balling

[11] Patent Number: 5,602,609
[45] Date of Patent: Feb. 11, 1997

[54] CAMERA WITH FILM SENSOR FOR CLOSING CASSETTE WHEN FILMSTRIP WOUND COMPLETELY INTO CASSETTE

[75] Inventor: Edward N. Balling, Rochester, N.Y.

[73] Assignee: Eastman Kodak Company, Rochester, N.Y.

[21] Appl. No.: 407,992

[22] Filed: Mar. 21, 1995

[51] Int. Cl.⁶ ........................................ G03B 1/00
[52] U.S. Cl. .................. 396/284; 396/513; 396/538
[58] Field of Search ............................ 354/212–216, 354/275, 277

[56] References Cited

U.S. PATENT DOCUMENTS

| | | | |
|---|---|---|---|
| 3,651,747 | 3/1972 | Kimura | 95/31 R |
| 5,083,721 | 1/1992 | Okutsu et al. | 242/71.1 |
| 5,231,438 | 7/1993 | Smart | 354/281 |
| 5,319,406 | 6/1994 | Takatori | 354/275 |
| 5,363,166 | 11/1994 | Takahashi et al. | 354/275 |

FOREIGN PATENT DOCUMENTS

| | | |
|---|---|---|
| 6-130557A | 5/1994 | Japan . |
| 6-130558A | 5/1994 | Japan . |
| 6-186675 | 7/1994 | Japan . |

*Primary Examiner*—David M. Gray
*Attorney, Agent, or Firm*—Roger A. Fields

[57] ABSTRACT

A camera for use with a film cassette having a light lock to be closed when a filmstrip is wound completely into the cassette and to be open when the filmstrip is outside the cassette, is characterized in that a closing part biased to close the light lock is supported for movement to be positioned against the filmstrip to be restrained by the filmstrip from closing the light lock when the filmstrip is outside the cassette and to be positioned across a particular space formerly occupied by the filmstrip to close the light lock when the filmstrip is wound completely into the cassette.

6 Claims, 4 Drawing Sheets

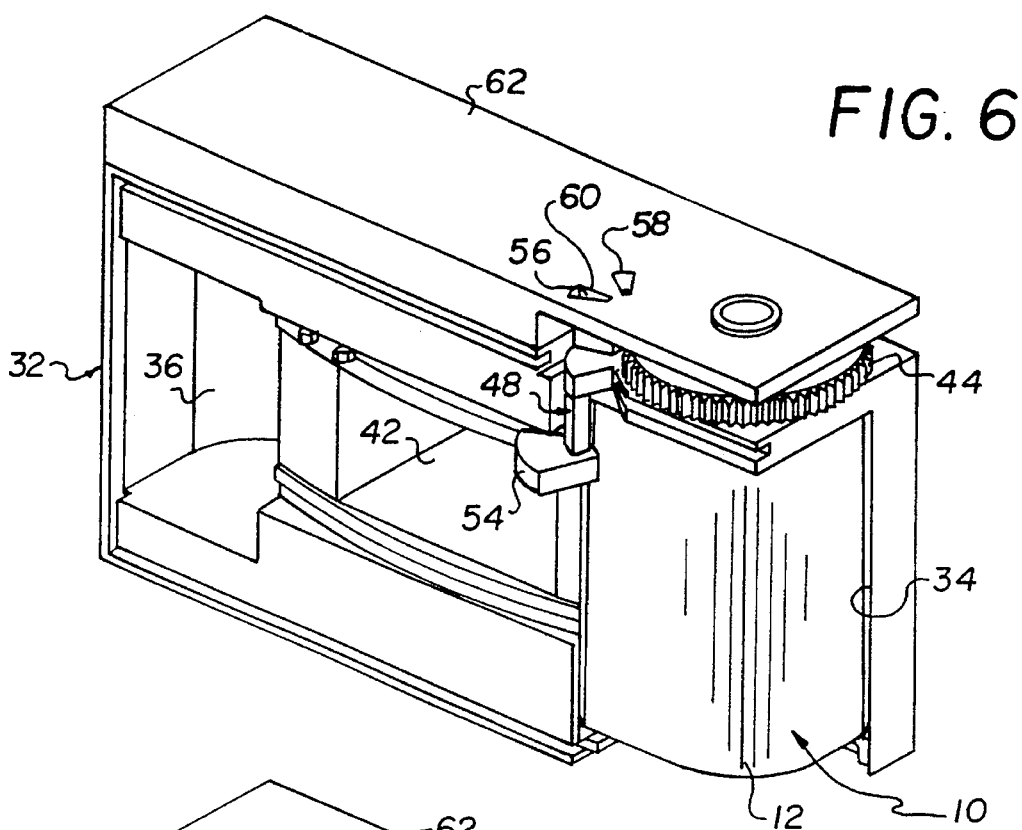
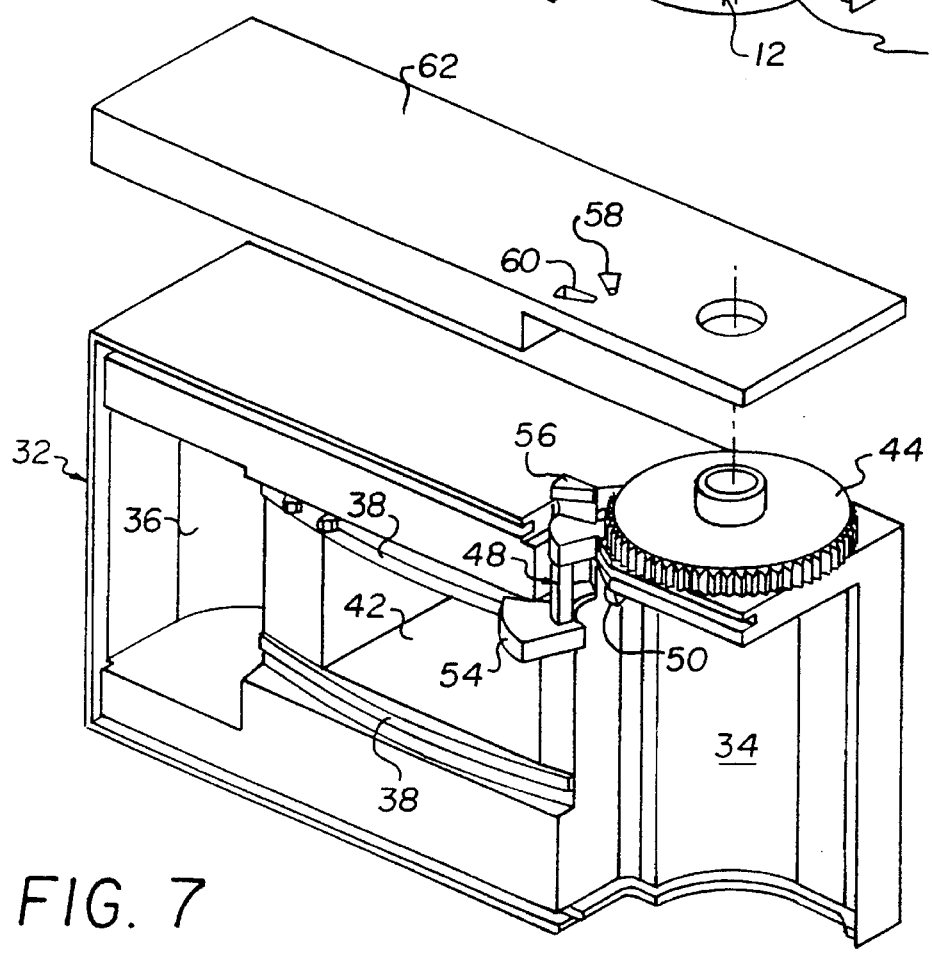

CAMERA WITH FILM SENSOR FOR CLOSING CASSETTE WHEN FILMSTRIP WOUND COMPLETELY INTO CASSETTE

CROSS-REFERENCE TO RELATED APPLICATION(S)

Reference is made to commonly assigned copending applications Ser. No. 08/371,336, entitled APPARATUS AND METHOD FOR CLOSING A FILM CASSETTE AND UNLOADING THE CLOSED CASSETTE FROM A CAMERA and filed Jan. 11, 1995 in the names of David C. Smart and Thomas E. Dussinger, Ser. No. 08/407,991, entitled CAMERA WITH BUILT-IN MEANS FOR CLOSING FILM CASSETTE AND EJECTING CLOSED CASSETTE and filed Mar. 21, 1995 in the name of Edward N. Balling, and Ser. No. 08/407,835, entitled CAMERA WITH BUILT-IN MEANS FOR CLOSING FILM CASSETTE AND TEARING OPEN CAMERA TO REMOVE CLOSED CASSETTE and filed Mar. 21, 1995 in the name of Edward N. Balling.

FIELD OF THE INVENTION

The invention relates generally to the field of photography, and in particular to a camera with a film sensor for closing a light lock of a film cassette inside the camera when an exposed filmstrip is wound completely into the camera.

BACKGROUND OF THE INVENTION

Film and cameras that are all in one, commonly referred to as single-use or one-time-use cameras, have recently become well known. Typically, the one-time-use camera is a simple point-and-shoot type comprising a plastic, inner, main body part which supports a fixed-focus taking lens, a film metering mechanism with a rotatably supported metering sprocket, a manual film advance thumbwheel, a single-blade shutter, a manual shutter release button, a frame counter for indicating the number of exposures remaining for picture-taking, a direct see-through viewfinder, and possibly an electronic flash unit. Plastic front and rear cover parts often house the main body part between them to complete the camera assembly, and the rear cover part connects to the main body part and/or to the front cover part to make the main body part light-tight. A decorative cardboard outer box contains the camera assembly and has respective openings for the taking lens, the shutter release button, the film advance thumbwheel, the viewfinder, the frame counter, and a flash emission window.

Typically, during original manufacture or recycling (remanufacture) of the one-time-use camera, a conventional light-trapping film cassette with a 35 mm filmstrip having a film leader protruding from the cassette shell, and a film take-up spool to which a leading end of the protruding film leader is attached, are placed in respective chambers in the main body part. The protruding film leader is positioned over the metering sprocket to place one of a longitudinal series of edge perforations in the leader onto one of an annular series of peripheral teeth on the metering sprocket in order to engage the leader to the metering sprocket. Then, the rear cover part is fitted to the main body part to prevent the protruding film leader from becoming separated from the metering sprocket, and as disclosed in prior art U.S. Pat. No. 4,972,649, issued Nov. 27, 1990, an exposed end of the film take-up spool is rotated to factory prewind substantially the entire length of the unexposed filmstrip from the cassette shell onto the take-up spool. Lastly, the outer box is placed on the camera assembly.

After the photographer takes a picture with the one-time-use camera, he or she manually rotates the thumbwheel to rotate a cassette spool inside the cassette shell to rewind the exposed frame into the cassette shell. The rewinding movement of the filmstrip the equivalent of slightly more than one frame width rotates the metering sprocket, which is in engagement with the filmstrip, to decrement the frame counter to its next lower-numbered setting. When the maximum number of exposures available on the filmstrip are exposed and the filmstrip is completely rewound into the cassette shell, the one-time-use camera is given to a photofinisher who tears the outer box off the camera unit, separates the rear cover part from the main body part, and removes the film cassette with the filmstrip from the main body part. Then, he removes the filmstrip from the cassette shell to develop the negatives and make prints for the customer, and he forwards the used camera parts to the manufacturer for recycling.

As contrasted with the conventional light-trapping film cassette, prior art U.S. Pat. No. 5,357,303, issued Oct. 18, 1994, discloses a new-type film cassette having a light lock which is pivoted closed to prevent ambient light from entering the cassette interior and is pivoted open to permit film movement out of and into the cassette interior. An implement or tool is designed to engage the light lock to pivot it open and closed.

Prior art U.S. Pat. No. 5,231,438, issued Jul. 27, 1993, discloses a camera intended for use with the new-type film cassette having a light lock which is pivoted closed to prevent ambient light from entering the cassette interior and is pivoted open to permit film movement out of and into the cassette interior. The camera has a release button which when manually moved in a releasing direction actuates a latching device. The latching device normally secures a door closed over a chamber holding the film cassette. However, when the latching device is actuated, it operates to pivot the light lock closed and to release the door to uncover the chamber.

The Cross-Referenced Application

Cross-referenced application Serial No. [our Docket No. 69152] discloses a camera comprising a cassette-receiving chamber for holding a film cassette provided with a light lock which is pivoted closed before removing the cassette from the chamber. An exterior opening to the chamber is positioned to longitudinally admit an implement into the chamber for rotation to pivot the light lock closed and to further admit the implement into the chamber to push the cassette out of the chamber. A latch securing a lid closed over the chamber is engageable with the light lock to be moved to release the lid when the light lock is pivoted open. The lid, when released, is hingedly supported to allow the cassette to push the lid open as the cassette is pushed out of the chamber.

SUMMARY OF THE INVENTION

A camera for use with a film cassette having a light lock to be closed when a filmstrip is wound completely into the cassette and to be open when the filmstrip is outside the cassette, is characterized in that:

means biased to close the light lock is supported for movement to be positioned against the filmstrip to be restrained by the filmstrip from closing the light lock when the filmstrip is outside the cassette and to be positioned across a particular space formerly occupied by the filmstrip to close the light lock when the filmstrip is wound completely into the cassette.

BRIEF DESCRIPTION OF THE DRAWINGS

FIGS. 6 and 7 are rear perspective views similar to FIGS. 4 and 5.

DETAILED DESCRIPTION OF THE INVENTION

Figure 1:
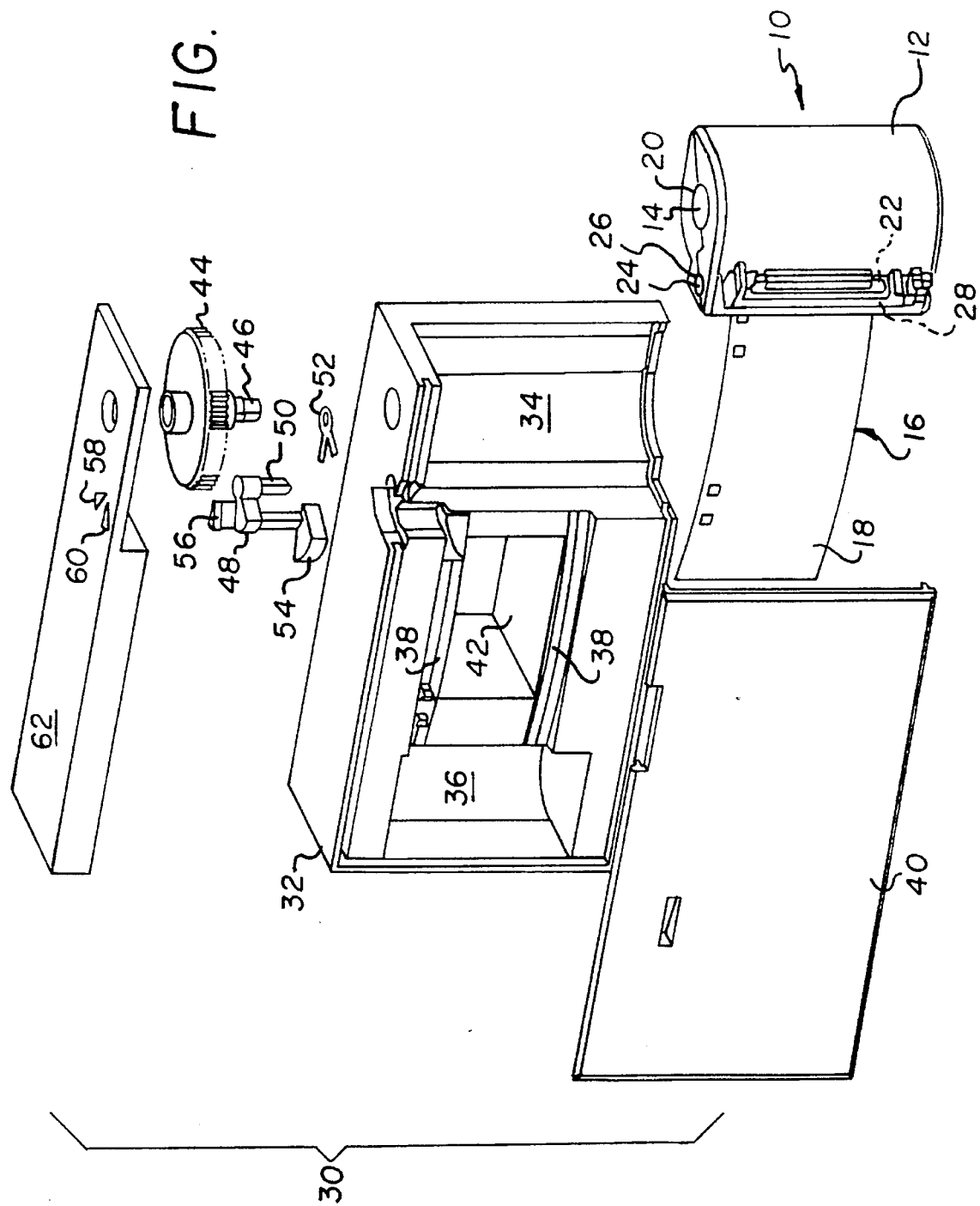
FIG. 1 is an exploded front perspective view of a camera according to a preferred embodiment of the invention and of a film cassette to be loaded into the camera.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1, 4, 5, and 6 show a film cassette 10 similar in operation to ones disclosed in prior art U.S. Pat. No. 5,357,303, issued Oct. 18, 1994, and U.S. Pat. No. 5,231,438, issued Jul. 27, 1993. The film cassette 10 comprises a cassette shell 12 housing a flanged spool 14 on which is stored a wound filmstrip 16 provided with an integral film leader 18. The cassette spool 14 has opposite exposed ends located in respective end holes 20 in the cassette shell 12 to support the spool for rotation. A light lock 22 has an integral shaft 24 which is supported at opposite exposed ends in respective end holes 26 in the cassette shell 12 to be pivoted open to uncover a film egress/ingress slot 28 in the cassette shell and to be pivoted closed to prevent ambient light from entering the shell interior through the slot.

Figure 2:
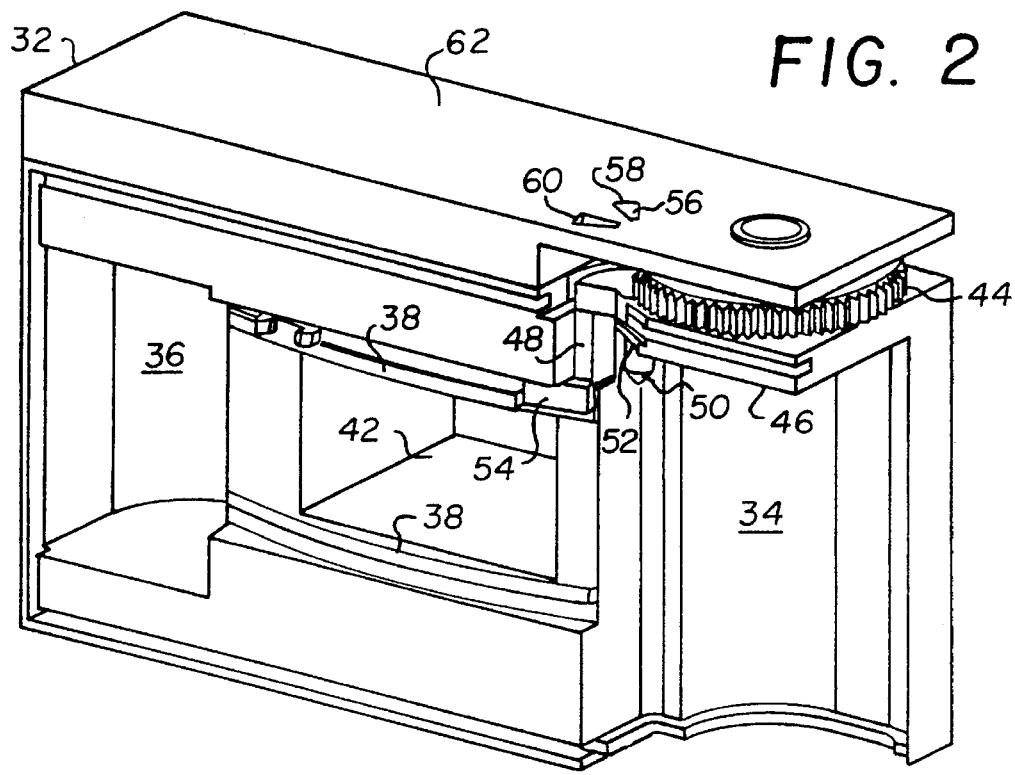
FIGS. 2 and 3 are rear perspective views of a main body part of the camera, shown from the inside of the main body part without the film cassette.
Figure 3:
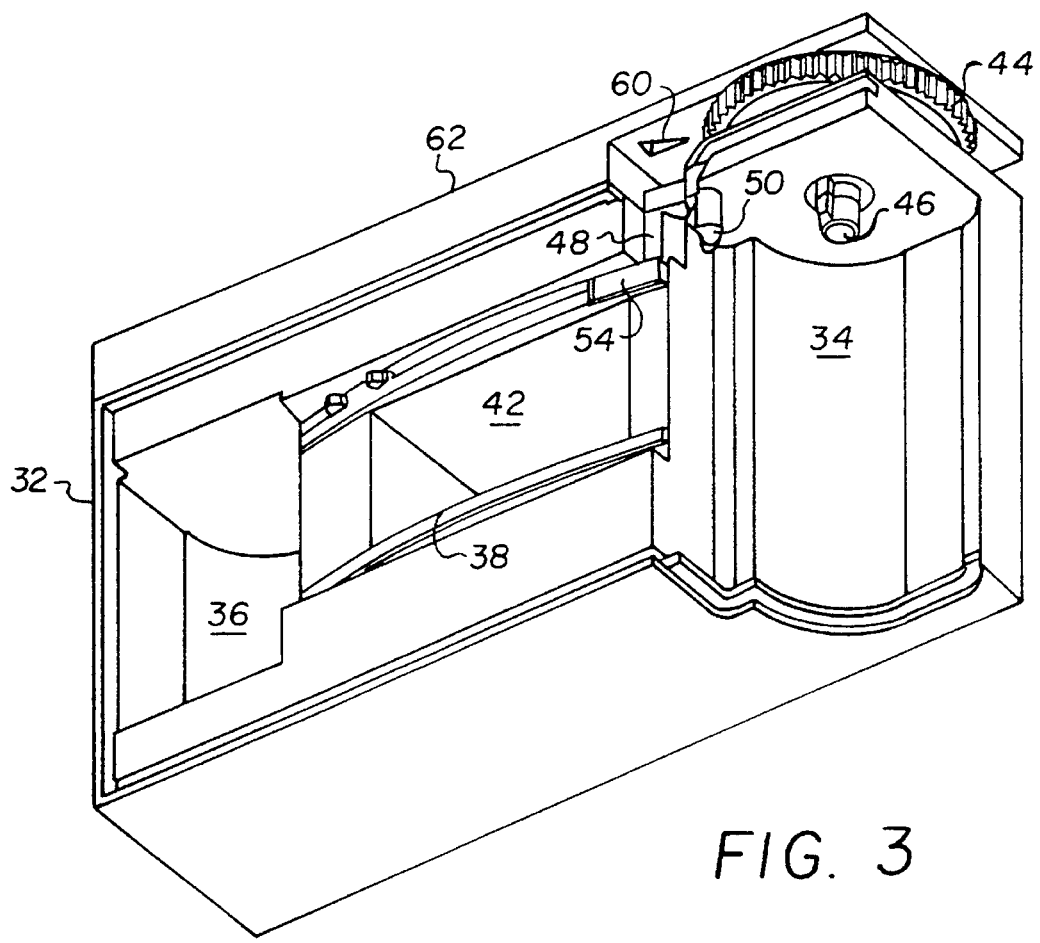
Figure 4:
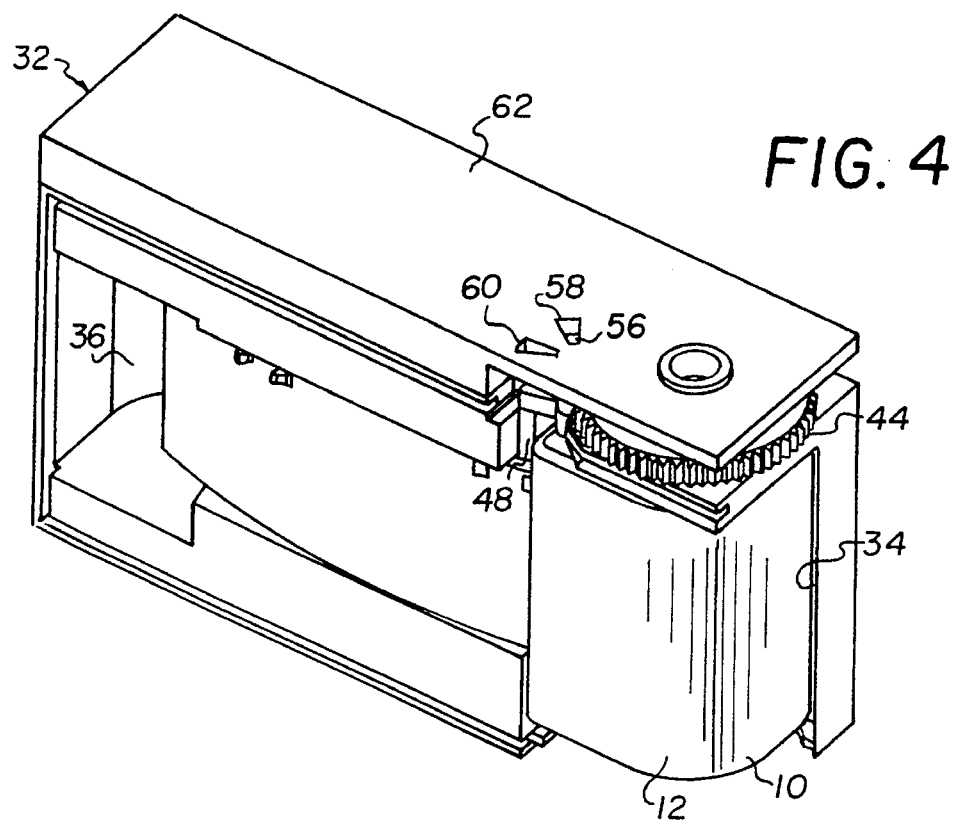
FIGS. 4 and 5 are rear perspective views similar to FIGS. 2 and 3, shown from the inside of the main body part with the film cassette.
Figure 5:
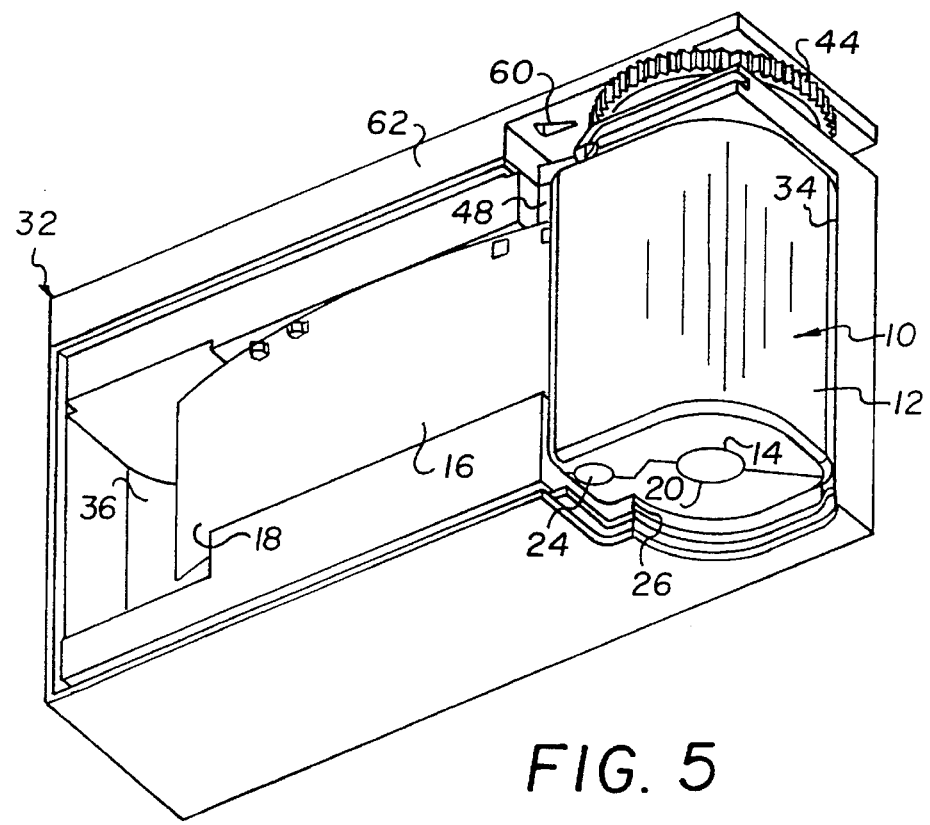

As shown in FIG. 1, a one-time-use camera 30 with which the film cassette 10 is to be used comprises a main body part 32 that defines a cassette-receiving chamber 34 and a unexposed film roll chamber 36, with a pair of parallel film rails 38 extending between the two chambers, and a front cover part (not shown) and a rear cover part 40 that house the main body part between them to complete the camera assembly. A backframe opening 42 at which successive longitudinal sections of the filmstrip 16 are to be exposed is located between the cassette-receiving chamber 34 and the unexposed film roll chamber 36. A film advance thumbwheel 44 rotatably supported on the main body part 32 has a depending coaxial projection 46 which protrudes into the cassette-receiving chamber 34 to engage one end of the cassette spool 14 in order to rotate the spool in a winding direction to wind each exposed section of the filmstrip 16 into the cassette shell 12 following its exposure. A closing lever 48 is pivotally supported on the main body part 32, and it has a depending coaxial projection 50 which protrudes into the cassette-receiving chamber 34 to engage one end of the integral shaft 24 of the light lock 22 in order to pivot the light lock to close the film egress/ingress slot 28 in the cassette shell 12. See FIGS. 2 and 3. A spring 52, shown in FIG. 1, biases the closing lever 48 to pivot the closing lever to, in turn, pivot the light lock 22 to close the film egress/ingress slot 28. The closing lever 48 has an integral film sensor 54 aligned with a top one of the film rails 38 in FIGS. 2 and 3, to be urged via the spring 52 against successive edge sections of the filmstrip 16 which are moved along the top rail toward the film cassette 10. The successive edge sections of the filmstrip 16 in contact with the film sensor 54 act to restrain the closing lever 48 as shown in FIGS. 4 and 5 from being pivoted outwardly via the spring 52 as shown in FIGS. 6 and 7. This prevents the closing lever 48 from pivoting the light lock 22 to close the film egress/ingress slot 28. Conversely, when the filmstrip 16 is removed from the film sensor 54, i.e. when the filmstrip including its film leader 18 is wound completely into the cassette shell 12, the spring 52 is free to pivot the film sensor outwardly as shown in FIGS. 6 and 7 to pivot the closing lever 48 to, in turn, pivot the light lock 22 to close the film egress/ingress slot 28. An integral indicator flag 56 projects from the closing lever 48 to be visible alternatively in respective windows 58 and 60 in a top cover 62 of the main body part 32 when the film sensor 54 is located against the filmstrip 16 and when the closing lever 48 is pivoted to pivot the light lock 22 to close the film egress/ingress slot 28. See FIGS. 2–7. Thus, the indicator flag 56 provides a visible indication whether or not the filmstrip 16 including its film leader 18 is wound completely into the cassette shell 12.

During original manufacture or recycling (remanufacture) of the one-time-use camera 30, the light lock 22 is opened and most of the unexposed filmstrip 16 beginning with its film leader 18 is prewound in the dark from the cassette shell 12 into an unexposed film roll. Then, the film cassette 10 and the unexposed film roll, with a longitudinal film section extending between the two, are placed in the cassette-receiving and unexposed film roll chambers 34 and 36, and the rear cover part 40 is attached to the main body part 32. When the film cassette 10 and the unexposed film roll are placed in the cassette-receiving and unexposed film roll chambers 34 and 36, the longitudinal film section extending between the two bears against the film sensor 54 to pivot the closing lever 48 against the contrary urging of the spring 52 as shown in FIGS. 4 and 5, to position the indicator flag 56 below the window 58.

The invention has been described with reference to a preferred embodiment. However, it will be appreciated that variations and modifications can be effected by a person of ordinary skill in the art without departing from the scope of the invention.

PARTS LIST 10. film cassette
12. cassette shell
14. cassette spool
16. filmstrip
18. leading film end
20. cassette end hole
22. cassette light lock
24. light lock shaft
26. cassette end hole
28. film egress/ingress slot
30. one-time-use camera
32. main body part 34. cassette-receiving chamber
36. unexposed film roll chamber
38. pair of film rails
40. rear cover part
42. backframe opening
44. film advance thumbwheel
46. thumbwheel coaxial projection
48. closing lever
50. lever coaxial projection
52. spring
54. film sensor
56. indicator flag
58. window
60. window
62. top cover

I claim:

1. A camera comprising a cassette-receiving chamber for holding a film cassette provided with a light lock which is to be closed when an exposed filmstrip is wound completely into the cassette, and closing means movable to close the light lock, is characterized in that:

a film sensor, separate from the cassette, for sensing the presence of the filmstrip outside the cassette is located to determine the filmstrip is wound completely into the cassette, and is coordinated with said closing means to permit the closing means to be moved to close the light lock when said film sensor determines the filmstrip is wound completely into the cassette.

2. A camera as recited in claim 1, wherein a spring biases said closing means to be moved to close the light lock, and said film sensor prevents the closing means from being moved by said spring when the film sensor senses the presence of the filmstrip outside the cassette.

3. A camera as recited in claim 2, wherein said film sensor and said closing means are a single-piece part supported for movement to jointly position the film sensor against the filmstrip and the closing means to hold the light lock open when the filmstrip is present outside the cassette and for movement to jointly position the film sensor across a particular space formerly occupied by the filmstrip and the closing means to hold the light lock closed when the filmstrip is wound completely into the cassette.

4. A camera as recited in claim 3, wherein a pair of film rails support respective longitudinal edges of the filmstrip outside the cassette, and said film sensor is substantially aligned with one of said film rails and is located adjacent said chamber when the film sensor is positioned against the filmstrip.

5. A camera as recited in claim 1, wherein 3 wherein said single-piece part includes an integral indicator flag visible from outside the camera for indicating in accordance with the particular position of the single-piece part whether or not the filmstrip is wound completely into the cassette.

6. A camera for use with a film cassette having a light lock to be closed when a filmstrip is wound completely into the cassette and to be open when the filmstrip is outside the cassette, is characterized in that:

means, separate from the cassette and biased to close the light lock, is supported for movement to be positioned against the filmstrip to be restrained by the filmstrip from closing the light lock when the filmstrip is outside the cassette and to be positioned across a particular space formerly occupied by the filmstrip to close the light lock when the filmstrip is wound completely into the cassette.

* * * * *